United States Patent [19]
MeLampy et al.

[11] Patent Number: 5,260,990
[45] Date of Patent: Nov. 9, 1993

[54] MULTIPLE INTEGRATIONS UNIT FOR COUPLING DIFFERENT SWITCHING SYSTEMS TO A MESSAGE STORAGE SYSTEM

[75] Inventors: Patrick J. MeLampy, Marblehead; Clifford M. Spencer, Arlington, both of Mass.

[73] Assignee: Boston Technology, Inc., Wakefield, Mass.

[21] Appl. No.: 693,555

[22] Filed: Apr. 30, 1991

[51] Int. Cl.[5] .................. H04M 1/64; H04M 3/42
[52] U.S. Cl. ........................ 379/67; 379/88; 379/89; 379/207; 379/219; 379/221; 379/225; 379/229
[58] Field of Search ............ 379/89, 67, 207, 220, 379/230, 239, 219, 221, 225, 229; 370/60, 60.1, 61

[56]  References Cited
U.S. PATENT DOCUMENTS 4,221,933  9/1980  Cornell et al. .................. 379/89
4,980,906 12/1990  Forson et al. .................. 379/89

Primary Examiner—James L. Dwyer
Assistant Examiner—Fan Tsang
Attorney, Agent, or Firm—Staas & Halsey

[57] ABSTRACT

The present invention is an apparatus that receives various types of call record information when a called number is busy or does not answer, and converts the call record information into uniform format information suitable for recording messages on a message storage system. The system receives the different call forwarding information from different devices and translates and reformats that information into mailbox information suitable for controlling a message storage operation. The system includes one integration process for each type of switching device even when plural devices of a particular type are connected to the system. The integration processes provide a uniform packet routed to the message storage system. Packets arriving from the message storage system defined for a switching device are presented to the integration processes in a uniform format.

11 Claims, 10 Drawing Sheets

Microfiche Appendix Included
(2 Microfiche, 76 Pages)

PBXI PACKET

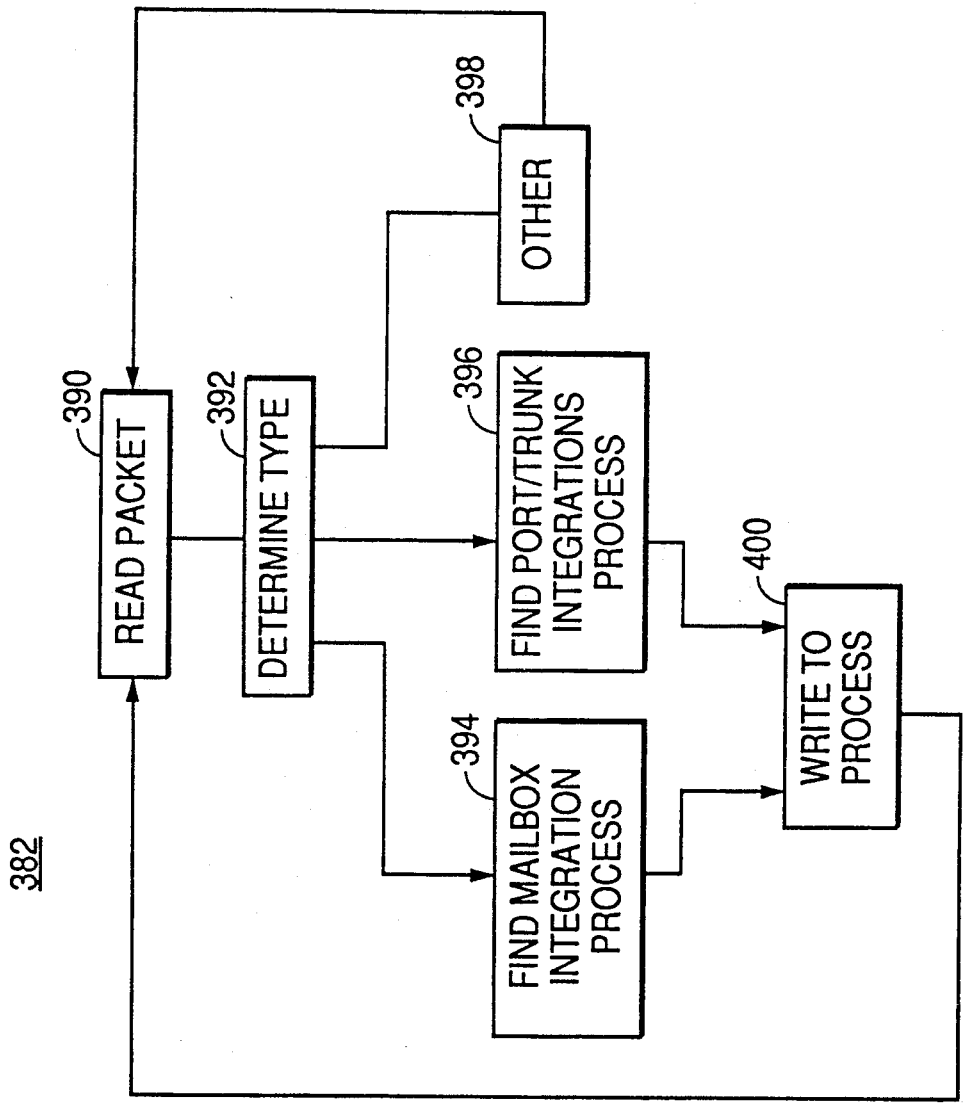

MULTIPLE INTEGRATIONS UNIT FOR COUPLING DIFFERENT SWITCHING SYSTEMS TO A MESSAGE STORAGE SYSTEM

CROSS REFERENCE TO RELATED APPLICATIONS

This application is related to U.S. application Ser. No. 07/393,270 filed Aug. 10, 1989 now U.S. Pat. No. 5,029,199 by Jones et al. incorporated by reference herein.

REFERENCE TO MICROFICHE APPENDIX

A microfiche appendix is attached and incorporated herein by reference having 2 fiche and 76 frames.

BACKGROUND OF THE INVENTION

1. Field of the Invention

The present invention is directed to a system that interfaces multiple call transfer devices to a single message storage system providing both packet routing and packet conversion functions and, more particularly, to a system that provides the message storage system with called party identification in a uniform information packet and provides a format dependant message waiting indication to the call transfer device regardless of the type based on a uniform message waiting indication, once a message is stored.

2. Description of the Related Art

Conventional message storage systems such as voice mail systems are designed to interface with specific types of devices that control and transfer a call to the message storage system. For example, a voice mail system could interface with an AT&T SS5 central office switch but not with a Northern Telecom Private Business Exchange (PBX) or with other central office switches from other manufacturers. Each of these switching devices provides call transfer information in a specific format and, in some cases, provides the information in a form not usable by the message storage system and in other cases does not provide sufficient information for proper recording of the message. What is needed is a system that will provide the interface between multiple types of switching devices and a message storage system.

SUMMARY OF THE INVENTION

It is an object of the present invention to provide an interface between multiple switching devices and a message storage system.

It is another object of the present invention to allow a large number of switching devices to be connected to a message storage system.

It is a further object of the present invention to provide the message storage system with called number identification and other information in a standard format, and to provide the switching system with a message waiting indication in the format of the switching system.

The above objects can be attained by a system that receives various types of call forwarding information when a called number is busy or does not answer, and converts the call forwarding information into uniform format mailbox information suitable for recording messages on a message storage system. The system receives the different call forwarding information from different devices, if necessary, adds as much information as possible to the call forwarding information and translates and reformats that information into the mailbox information suitable for controlling a message storage operation.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 12 illustrates routine 382.

DESCRIPTION OF THE PREFERRED EMBODIMENTS

Figure 1:
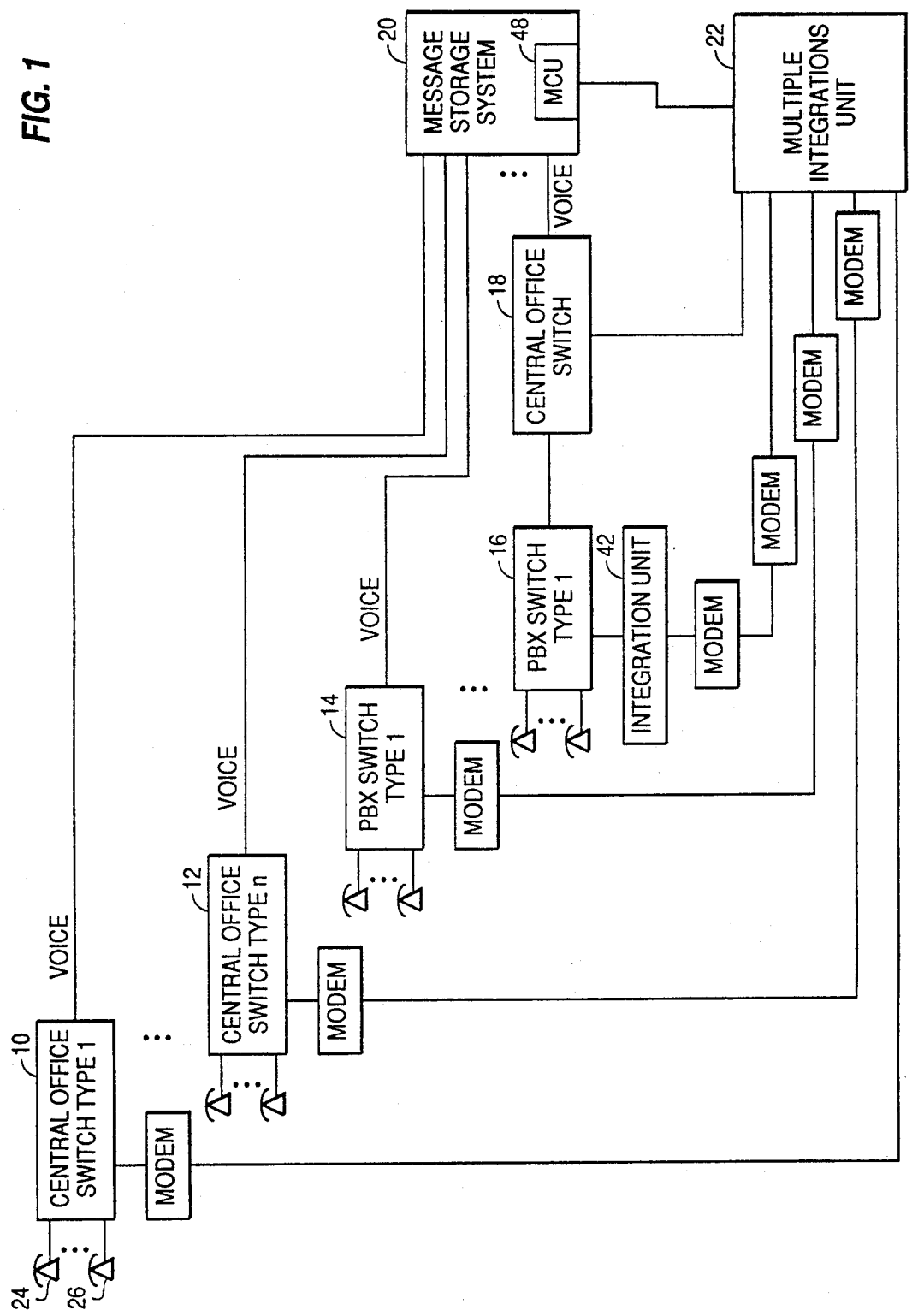
FIG. 1 illustrates the relationship of the present invention to telephone switching systems and to a message storage system 20.

The present invention solves the problems discussed above, relating to multiple switching devices 10-18 routing message calls to a message storage system 20, by providing a multiple integrations unit 22 that translates, reformats and routes the call record information, and adds, if necessary, information to a common or uniform call record format usable by the message storage system 20. The switching devices 10-18 are connected to dedicated lines connected to the MIU 22 which allows the MIU to identify the needed format by the device address or incoming line. The switching devices communicate to the MIU through modems unless the switching devices are in the same room or building as the MIU 22.

In a typical central office operation when a user of telephone 24 is attempting to call telephone 26 the central office switch 10 monitors the progress of the call. When the telephone 26 is either busy or does not answer after a predetermined number of rings, such as 5, (called a ring no answer) the central office switch 10 transfers the telephone call placed by telephone 24 to the message storage system 20. The message storage system 20 will play an appropriate mailbox greeting to the user of telephone 24 depending on the state of the telephone call at the time the transfer occurs. For example if the telephone 26 is busy, the message storage system plays a greeting indicating that the user of telephone 26 is busy with another call and the greeting requests that the user of telephone 24 leave a message. If no one answers telephone 26 after the predetermined number of rings, the message storage system will play a message indicating that the user of telephone 26 is away from the telephone temporarily and also requesting that the user of telephone 24 leave a message. In such a situation the central office switch 10 must indicate to the message storage system 20 not only the telephone number of telephone 26, that is the called party telephone number, but also must indicate the status of the call at the time of the transfer, that is whether the phone was busy or a ring no answer occurred and the trunk of the MSS 20 to which the call is transferred. The switch 10 should also provide the telephone number of the calling telephone 24. Some switches provide additional information that is not used by the message storage system 20, for example, an NEAX 2400 MCI device provides the telephone number to which the call was forwarded.

In today's multi-vendor switching market most vendors, whether of a central office switch or a PBX, provide call record information, however, different information is provided and such information is provided in different and various formats. For example, central office switches 10 and 12 could be 5A or 1E switches provided by AT&T, or DMS 100's provided by Northern Telecom which both provide SMDI (Simplified Message Desk Interface) protocol called party information making standardization for such central office switches relatively simple. PBXs 14 and 16 could be Northern Telecom SL1's, Rolms CBX, NEC's NEAX 2400, AT&T System 75/85, Intercom IBX, Hitachi HCX, etc. The protocol for the called party information for PBXs is generally non-standard. In addition, some vendors do not provide sufficient information to record a message and additional information must be obtained from the caller by the message system. The MIU 22 can interface with 32 switches with 32 different protocols.

As mentioned above, the present invention is also designed to convert the call record information produced by various types of PBX switches 14 and 16 which transfer a message call through a central office switch 18 to the message storage system. In a typical message operation in which a PBX is involved, the operation is more complicated than in the central office case because the call record information is non-standard, but essentially the same tasks are necessary. For example, if the PBX 14 is connected directly to the MSS 20 over a dedicated trunk, the call is transferred to the MSS by the PBX 14 as if a conventional call transfer had occurred and the call record information, including the trunk of the MSS 20 used, is sent to the MSS 20 through the MIU 22. On the other hand, if the PBX 16 is not directly connected to the MSS 20 but is connected thereto through a central office switch 18, the PBX 16 must place a call through switch 18 to a particular line of the MSS 20 and indicate to the MSS 20 through the MIU 22 the line being used as well as the called number and calling number. It's also possible for a PBX to be connected to switch 18 and provide in-band signalling to the MSS 20 to identify the party. In such a situation the MIU 22 is only responsible for the message waiting indicator. In some cases where a PBX is involved, a complete telephone number is not available from the PBX as part of the call record information. In some of these cases only an extension number is available from the PBX and in other cases only a port or trunk number is available. In such situations the invention must translate the extension or port into a unique mailbox identifier such as a ten digit telephone number.

Figure 3A:
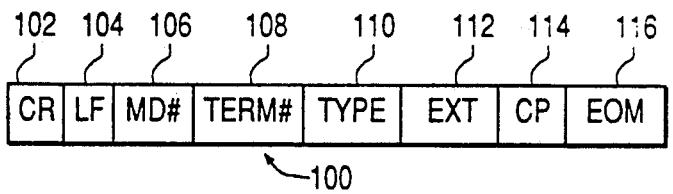
FIGS. 3A-3E illustrate examples of various packets which the various central office switches, PBX switches and integration units send to the MIU 22.

Some of the PBX switches, such as a Northern Telecom SL1, the PBX requires an integration unit 42 because the PBX does not provide out of band call record information and does not provide information for functions such as call transfer. If needed, an appropriate integration unit for a PBX 16, such as the SL1 PBX is available from Boston Technology of Wakefield, Mass. An integration unit for an AT&T System 75 PBX is available from Voice Technologies Group of Buffalo, N.Y. Typically, when a PBX 16, such as an SLI PBX that requires an integration unit, receives an incoming call the PBX 16 directs it to the appropriate extension. If the call is not answered at the extension (ring no answer) or if the extension is busy or if the all calls forwarded condition exists, the call is forwarded by the PBX to the integrations unit 42. In this situation, the PBX 16 does not provide ring no answer, busy or all calls forwarded information to the integrations unit 42 when it forwards a call to the integrations unit but instead connects each call type to a different extension connected to the integrations unit 42. That is all ring no answer calls are forwarded to a first extension, all busy calls to a second and all forward all calls to a third. The integration unit 42 will control the PBX 16, as would a human operator, to transfer the call to the message storage system 20. The integration unit 42 will also create a call record information packet and forward it to the MIU 22. Such a packet created for a Northern Telecom SL1 PBX is illustrated in FIG. 3E. The integration unit available from VTG creates an SMDI packet as illustrated in FIG. 3A. Upon completion of the call, a message waiting indication packet and/or a call termination packet from the MIU 22 will cause the integration unit 42 to send a packet to the PBX 16 to terminate the transferred call and turn on a message waiting light, if appropriate. The message storage system 20 which includes a master control unit computer 48 is described in detail in the application previously referenced.

Figure 2:
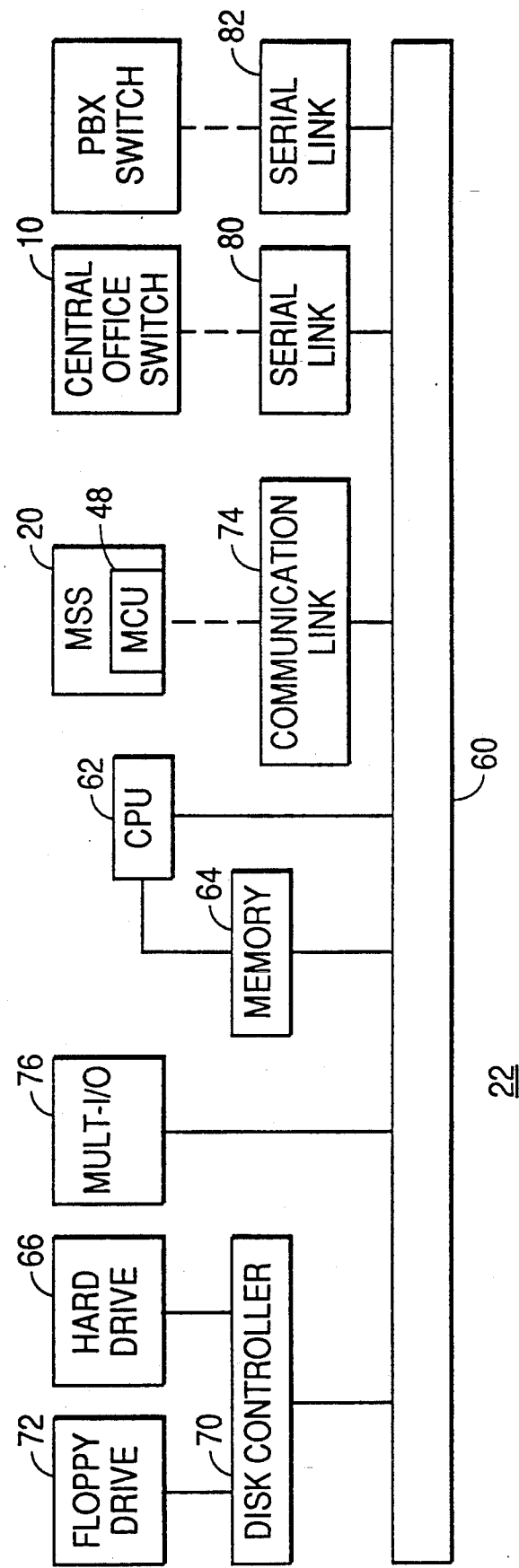
FIG. 2 depicts the components of the multiple integrations unit (MIU) 22 of the present invention.

FIG. 2 illustrates the hardware component details of the multiple integrations unit (MIU) 22. The MIU 22 is essentially an IBM AT type computer with special communications cards mounted on the backplane 60. The CPU 62 is based on the Intel 80386 processor and an appropriate unit is available from Sigma Design of Fremont, Calif. as Model No. CPA3820BACX. The CPU 62 stores temporary data and messages, as well as the MIU control programs that are executing, in a memory unit 64 configured for eight megabytes of random access memory. A suitable memory unit 64 is available from Sigma Design of Fremont, Calif. as Model CMA380K00n while the memory chips for the unit can be obtained from Centon of Wilmington, Mass. The CPU 62 has direct access to the memory 64 via a conventional bus. The programs and temporary data can be stored on a hard disk drive 66 and its operation is controlled by a disk controller 70. The hard drive 66 is available from Anthem of Wilmington, Mass. as Maxtor Model No. XT8380E while the disk controller 70 is available from DPT of Maitland, Fla. as Model PM301/75. A floppy disk drive 72, which is preferably a Fujitsu Model M2553K03A, is used for loading the system initially and for any maintenance modifications that need to be performed. The MCU 44 of the MSS 20 is connected to the MIU 22 of FIG. 2 through a conventional Ethernet communications link 74 which is available from Excelan of Nashua, N.H. as Model No. 9900615-01. A conventional multi-IO unit 76 provides an interface for a video display whenever maintenance of the MIU 22 is necessary. Conventional serial links 80 and 82 available from Equinox Corporation of Miami, Fla. as model numbers 950083-2 and 990122 which provide 16 serial ports terminating on two panels. These links provide serial connections to the central office switches 10 and 12, PBX switches 14 and 16 and integration unit 42.

The various computer programs executed within the MIU 22 are preferably written in the "C" programming language and an appendix of the programs executed by the processor 62 is included herewith. The software for performing integration operations for SMDI and SL1 protocols is provided in the microfiche appendix previously mentioned. The processor preferably uses an operating system such as Xenix or Unix System V which allows multiple real time tasks. It is also preferred that the processor 62 execute UNIX based select processing which transfers and controls the transfer of messages and data streams, including information packets, via file descriptors. In this processing environment the various processes wake up and execute whenever a file descriptor has data resident in the process' file descriptor input buffer. This environment allows a single process to wait on many different things without being blocked because of a lack of a response. During this operation all of the file descriptors in the buffer are processed and the process goes back to sleep awaiting additional file descriptors once processing of all file descriptors is completed. The communications protocol used between the MIU 22 and the MCU 48 is preferably the TCP/IP protocol available from Excelan.

The simplified message desk interface (SMDI) packet 100 of FIG. 3A is provided by an AT&T central office switch such as an 5A switch. This packet 100 includes start of packet fields 102 and 104, field 106 indicates a message desk number and field 108 stores a terminal number which is mapped to a port on the MSS 20 using the following matrix in a look-up operation:

| Message Desk | Start Terminal | End Terminal | Starting MSS Port | Ending MSS Port |
| --- | --- | --- | --- | --- |
| 01 | 0001 | 0016 | 101 | 116 |
| 02 | 0001 | 0004 | 001 | 004 |

For example, message desk 01, terminal 0012 becomes MSS port 112, while message desk 2, terminal 1 becomes MSS port 001 during the look-up matrix operation. The call type field 110 indicates whether the telephone status is a ring no answer, busy, direct call or calls forwarded in an alphabetic code and is changed to a specified numerical value and placed in universal packet (see FIG. 4A) sent to the MCU 48. The extension 112 contains a digit string three to ten digits long which is converted to a telephone number known to the MCU 48. This number has a format of either: country code, area code, seven digit number (exchange and line); or switch name, extension. The MIU 22 completes the number using the extension 112 and the known exchange, area code and country code stored in the MIU 22 for the particular serial line over which the packet 100 arrived, and places the number in the universal packet. The calling party field 114 stores a three to ten digit number indicating the number of the caller. This number is also converted into a complete telephone number like the extension 112. The end of packet character is formed in the last field 116.

Figure 3B:
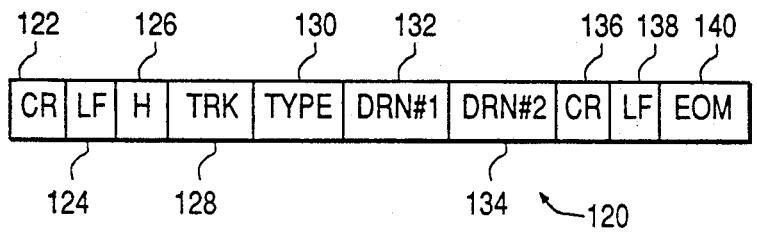

FIG. 3B illustrates the call record packet sent to the MIU 22 by a PBX from Intercom IBX. This packet 120 starts with a carriage return 122 and line feed 124 followed by a header 126. The trunk number in field 128 gets converted into an MSS port via a table look-up operation using a table that includes two columns, the first column containing PBX trunks and the second column containing corresponding MSS trunks. The type stored in field 130 includes ring no answer, busy and all calls forwarded stored as alphabetic type indicators. The DRN#1 field 132 contains the called party number and the DRN#2 field 134 contain the calling party number. These fields are converted into a complete telephone number or switch name extension as previously discussed. The remaining fields 136, 138 and 140 indicate the end of the packet.

Figure 3C:
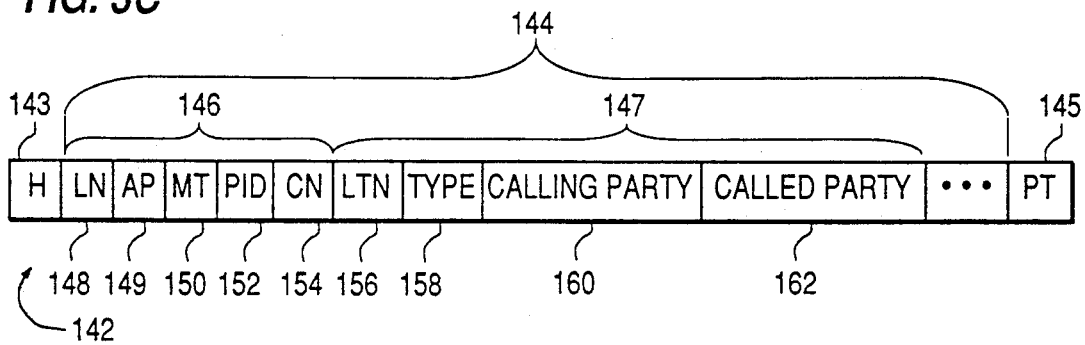

FIG. 3C illustrates an SL1-IVMS packet 142 produced by a Northern Telecom PBX. This packet 142 includes a packet header 143, a message 144 and a trailer 145 a message header 146 and message text 147. The message header 146 includes message length 148, an application identifier 149, a message type 150, a process identification number 152 and a customer number 154. The message 147 includes a port number on the PBX connected to the MSS 20. The PBX port number is converted into a MSS port number using a table look-up operation as explained above. A command field 158 includes the call type which includes call forward, busy or ring no answer in a numeric code. A calling party 160 and called party 162 are also provided. These fields are three to four digits and need to be completed as previously discussed.

Figure 3D:
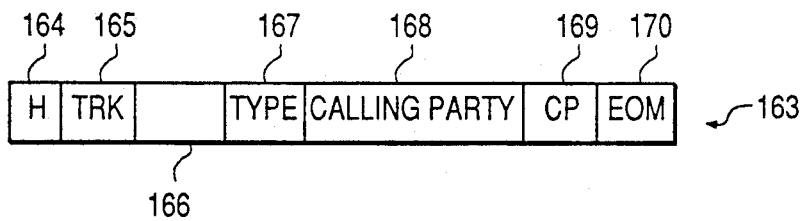
Figure 3E:
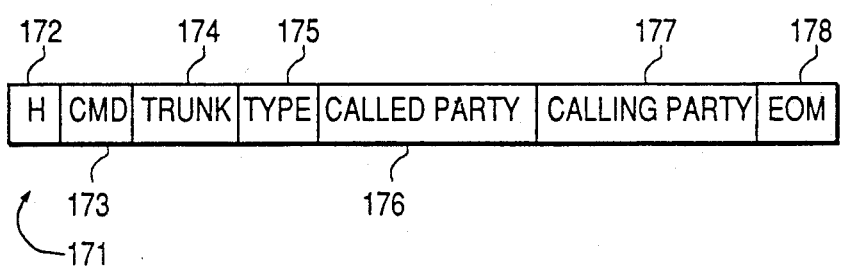

The NEAX 2400 MCI link packet 163, as illustrated in FIG. 3D, includes a header 164 followed by a trunk number 165 that is translated into the MSS port via a look-up table. The field 166 is a filler which is reserved for future use. The type field 167 stores a numeric code for ring no answer, busy and forward all calls. The calling party field 168 and called party field 169 stores a station designator plus a six digit extension. The numbers and codes are appropriately translated and stored in the universal packet of FIG. 4A.

FIG. 3E illustrates a call arrival packet 171 from an integration unit 42 for an SL1 PBX. This packet 171 includes a header 172 and a command 173 indicating an integration packet. The trunk field 174 identifies the port on the integration unit receiving the call, while call type 175 identifies whether the call is a direct call, or a transfer due to ring no answer or busy. The called party 176 and calling party 177 fields provide seven digit numbers in which an extension is preappended with zeros.

The call arrival packet from a AT&T system 75/85 PBX is identical to the packet illustrated in FIG. 3A.

Figure 4A:
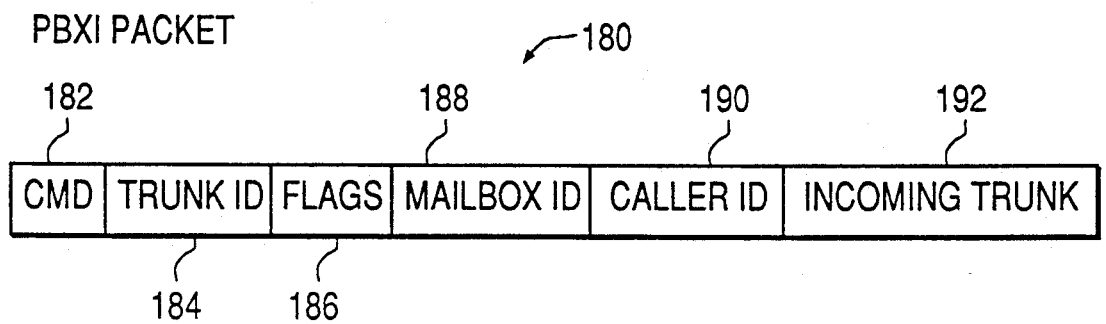
FIGS. 4A-4C illustrate the packets that the MIU 22 transmits back to the switches and integration units.

The universal call arrival packet (PBXI) or universal integration packet 180 produced by the MIU 22 and sent to the MCU 48 is illustrated in FIG. 4A. This packet 180 includes a command field 182 that indicates that the call has failed. The trunk ID field 184 identifies the port on the MSS 20 which will handle the call and is not used by the MIU. The flags field 186 indicates the status of the failed call such as ring no answer, busy, a direct call and all calls forwarded. The mailbox ID 188 identifies the telephone being called on failed calls and the calling party telephone number if a direct call. The caller ID field 190 holds the telephone number of the caller, if known, and when a call fails is used to set the sender field in stored messages. The incoming trunk field 192 is the trunk number that the call is located on at the central office switch or PBX and is used for identification of the incoming line on the MSS. The incoming trunk is provided by the matrix or table look up mapping previously described.

Figure 4B:
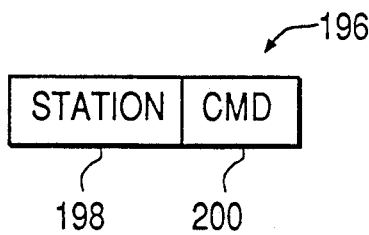
Figure 5A:
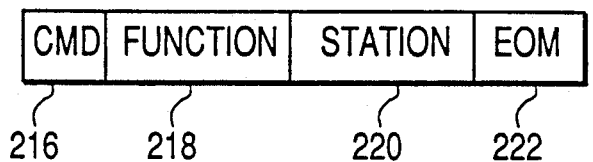
FIGS. 5A-5C illustrates the packet transferred between the MCU 48 of the MSS 20 and the MIU 22.
Figure 5B:
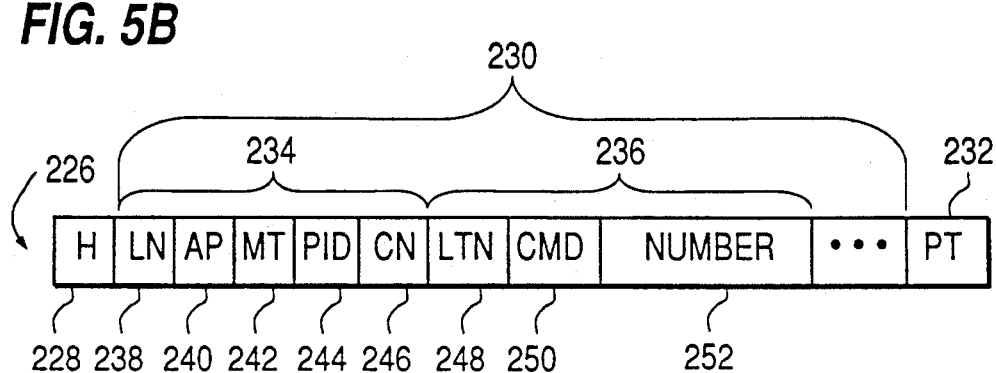
Figure 5C:
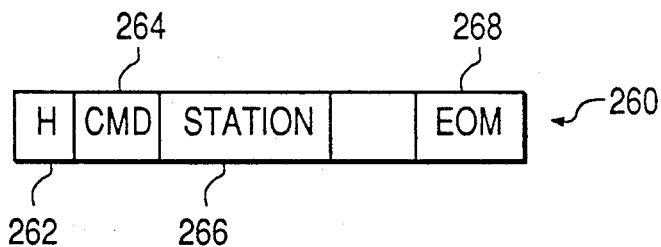

FIG. 4B illustrates the universal message waiting indication packet sent from the MCU 48 to the MIU 22. This packet indicates that a particular message waiting indicator, such as a light on a telephone, of a PBX should be set to value. The MIU receives the packet and transmits a reformatted and rearranged sequence to the designated PBX or central office switch. The sequence and format for the reformatted packets for the PBXs central office switches are shown in FIGS. 5A-5C. The packet 196 includes a station designator 198 which contains the full telephone number of the phone or the switch name, extension as previously discussed. A command field 200 is also included which indicates whether the message indicator should be set on or off.

Figure 4C:
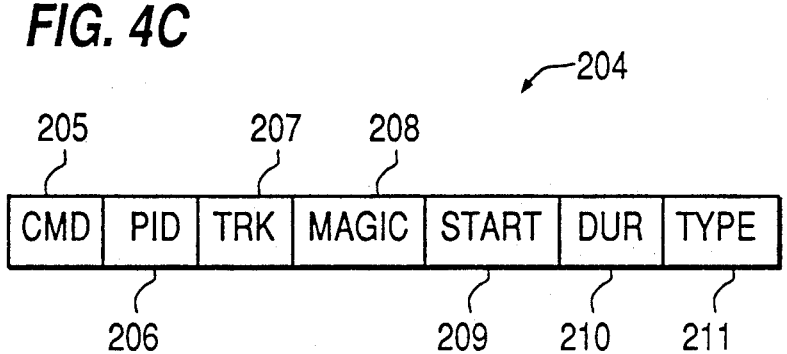

A universal call termination or disconnect packet 204, as illustrated in FIG. 4C, can also be sent from the MSS 20 to the MIU 22 whenever a call is to be terminated. The command 205 indicates that the telephone session is at an end and should be disconnected. A process organization identifies 206 which is not used can identify the process originating the message. This packet 204 also includes port number 207 of the MSS which uniquely identifies the call. This port number is translated, by the MIU 22, into the trunk or line or message desk and station or switch name and extension as required by the receiving device. The field 208 can be used to validate the product, however this field is not used. The start 209 and duration 210 field can provide session times but are not used, The type field 211 provides the direction of call as a numeric value indicating an incoming or outgoing call.

FIG. 5A depicts the message waiting indication (MWI) packet 214 in SMDI format suitable for an AT&T 5E switch or AT&T PBXs. The packet 214 includes an alphabetical command 216 that indicates to actuate or extinguish the indicator identified by the station 220. The function field 218 indicates that the command relates to a message circuitry indicator. The MWI packet for the Intercom IBX PBX has the same structure.

The MWI packet 224 for the SL-1 PBX is illustrated in FIG. 5B. As in the call arrival packet, this packet 226 includes a packet header 228, a message 230 and a packet trailer 232. The message includes a message header 234 and message text 236. The message header 234 includes message length 238, an application identifier 240, a message type 242, a process identifier 244 and a customer number 246. The message text 236 includes a port number 248 on the SL-1 PBX that is connected to the MSS 20, a command 250 indicating that this is an MWI. The field 252 indicates the number of the called party as a three to four digit extension. A reverse translation creates this packet from the packet of FIG. 4B.

The NEAX-2400 MCI message waiting indicator packet 260 is illustrated in FIG. 5C. This packet 260 includes a header 262, a command 264 indicating MWI and a station 266. Once again, a reverse translation creates this packet.

Figure 6:
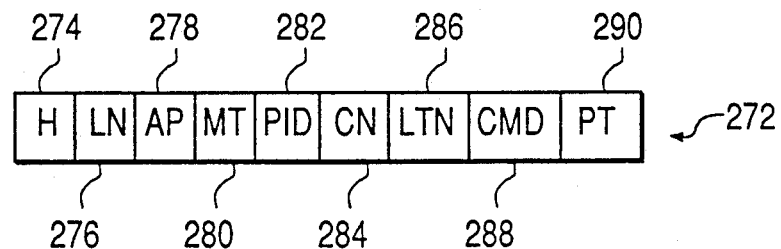
FIGS. 6 illustrates call termination packets sent by the MIU 22 to the switches.

FIG. 6 illustrates an SLI-IVMS call termination or hang-up packet 272. The fields 274-286 and 290 have been described with respect to FIG. 5B while the field 288 is the command field which includes the hang-up command.

Figure 7:
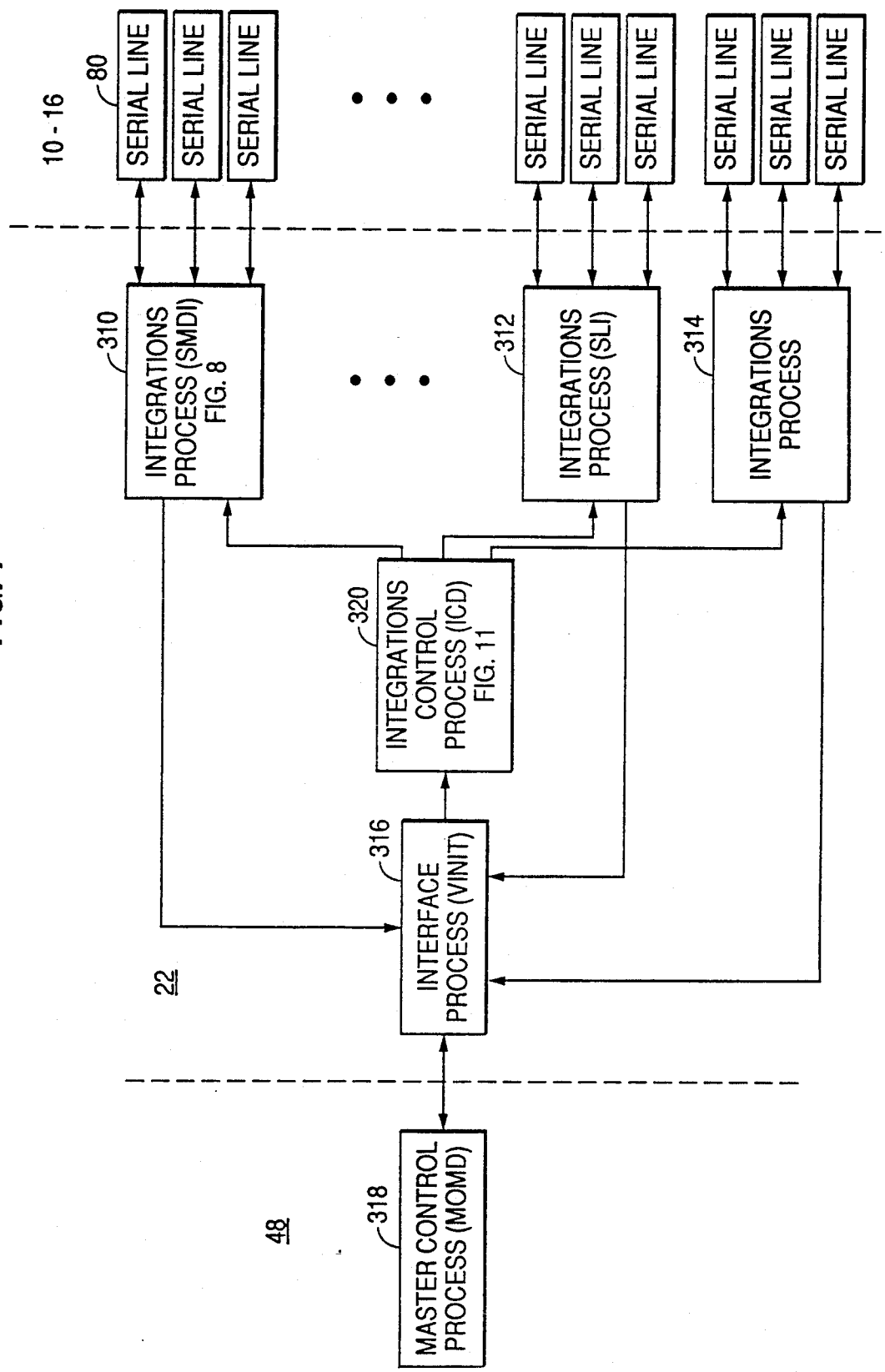
FIG. 7 illustrates the processes executed by the MIU 22.

FIG. 7 illustrates the process organization and data flow which occurs between the processes within the MIU 22 and to other processes or devices connected to the MIU 22. Each of the types of switching systems to which the MIU is connected has a dedicated integration process 310-314 associated with that device. That is a separate integration process is spawned for each integration or protocol type. Each process 310-314 has an output data stream to an interface process 316. Each process 310-314 transmits uniform call arrival packets to the interface process 316 which forwards the packet to a master control process running in the MSS 20. Outgoing packets are fed to an integration control process 320 by the interface process 316. The integration control process 320 is responsible for starting individual integration processes 310 and 314 and has the knowledge necessary to route the outgoing packets to the appropriate integrations process. Each integrations process is responsible for interpreting the protocol on the serial lines 80 allocated to it, and each presents a uniform interface to the integrations control process 320. By creating an environment in which all integrations have the same interface to the world, it is possible to offer new integrations as layered products merely by adding a new integrations process. By having only one integrations process running for each protocol type speed and memory utilization are enhanced.

FIG. 7 illustrates an integrations process 310 for SMDI devices from AT&T, a process 312 for SL1 devices from Northern Telecom and a generic process 314 for other types of devices. The source code for the SMDI 310 and SL1 312 processes can be found in the appendix included herewith. During a typical operation a process, for example the SMDI process 310, will receive the call record information over one of the serial link devices 80. When a complete packet is received the process 310 converts the SMDI information as illustrated in FIG. 3A into a packet in accordance with FIG. 4A. This packet is transferred to the interface process 316. The details of the interface process 316 can be found in the related application previously mentioned. This process 316 transfers the packet over the communication link 74 to the master control process 318 executing in the MCU 48. The master control process is also described in detail in the related application. When the message recording operation associated with the message left by the user of telephone 24 is complete, if necessary, the master control process 318 transfers a termination packet or a message waiting indicator packet back to the interface process 316. The interface process 316 transfers the packet to the integration control process 320 which determines the type of integration and therefore the type of device for which the return message needs to be formatted. Once the type is determined, the integrations control process 320 transfers the packet to the appropriate integrations process 310-314. The source code for the integrations control process 320 can also be found in the appendix included herewith.

Figure 8:
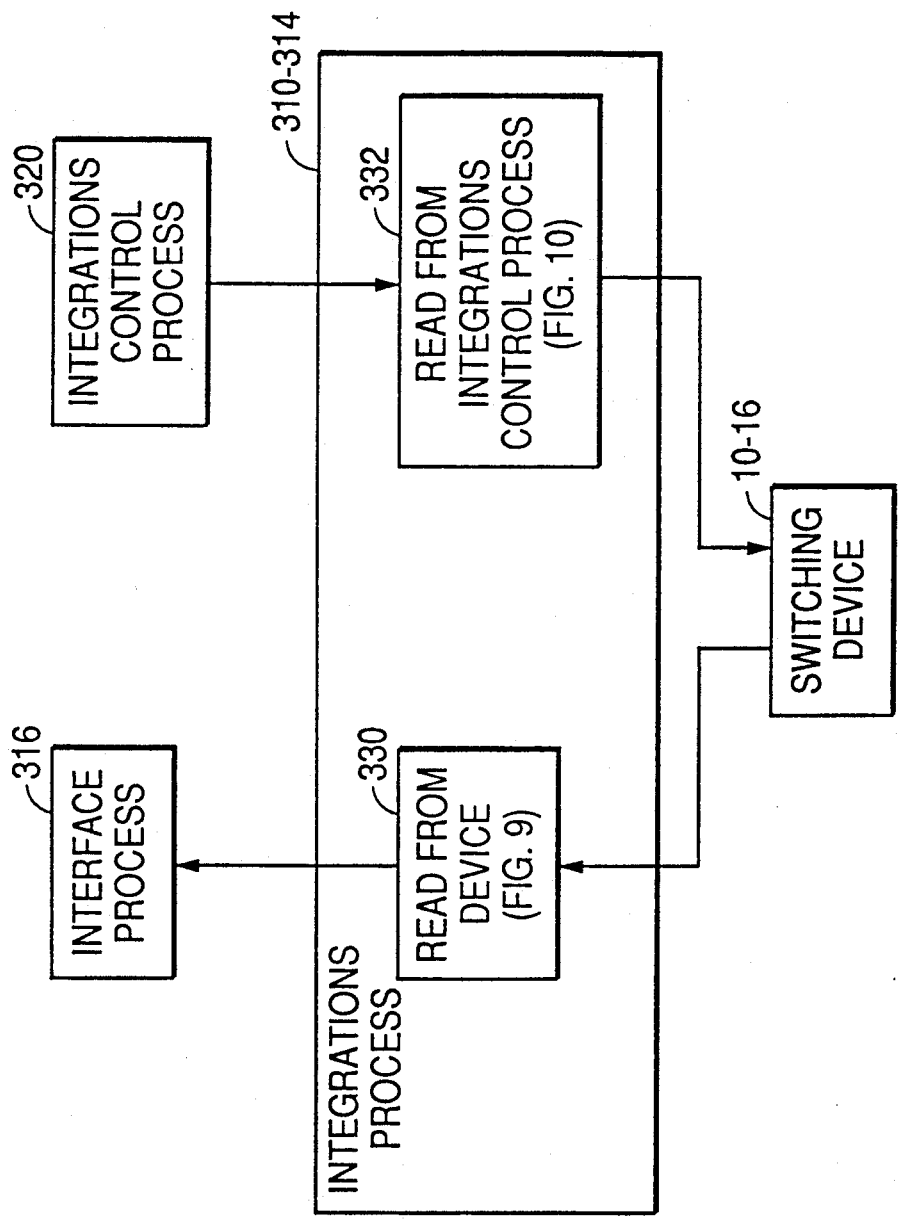
FIG. 8 depicts the integrations process 310.

As illustrated in FIG. 8 each integrations process 310-314 includes a read from device routine 330 and a read from integrations control process routine 332. The routine 330 reads the call control information from the switching device, converts that information, adds to the information if necessary, and transfers that information to the interface process 316. In a corresponding manner the read from integrations control routine 332 reads the call termination or message waiting message from the integrations control process 320, reformats the information and determines which of the switching devices of this type this message is destined for and transfers it to the switching device 10-16.

Figure 9:
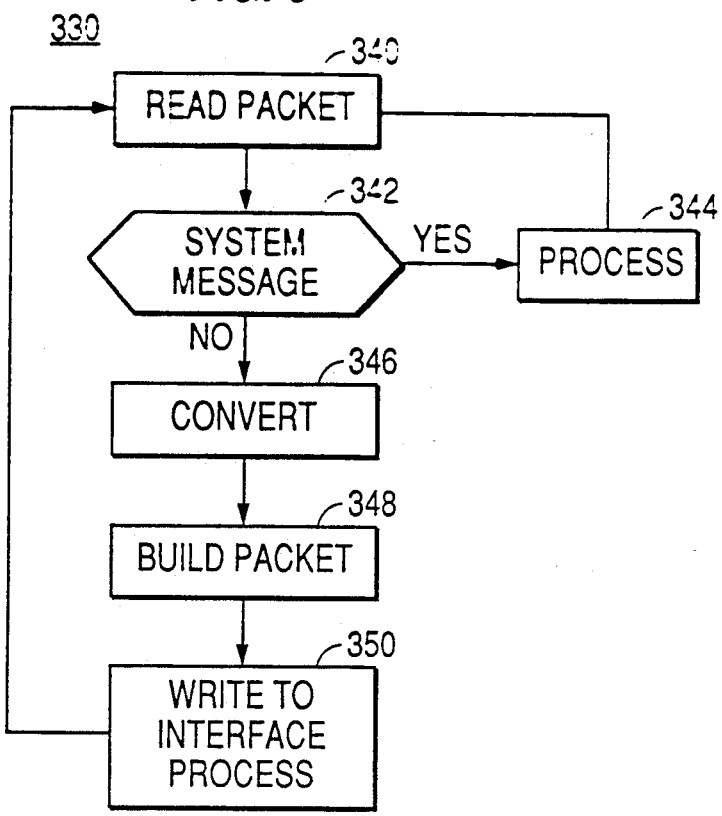
FIG. 9 depicts the routine 330 of the integrations process.

The read from device routine 330, as illustrated in FIG. 9, reads 340 a full or complete packet transferred to the MIU 22 by the switching device. That is, the routine 330 receives each character of the packet and stores it in an appropriate buffer and when the entire packet has arrived, as indicated by an end of message indicator or similar character, the packet is read 340 from the buffer. The routine then determines 342 whether the message is a system message. For example, the link between the switching device and the MIU 22 is periodically tested by transferring a system message over the link. If the message received is a system message appropriate processing 344 is performed. If the message is not a system message, but the call record information expected by this particular integrations process, the system converts 346 the information from the device into standard mailbox information for the MSS 20. The conversion process is enhanced by a configuration table which stored in the MIU 22 and associated with each serial line 80 and thus with each switching device. The configuration table indicates the type of protocol by a separate table entry for each instance of a protocol. Thus for each SMDI serial channel there will be a table entry and for each SL-1 serial channel there will be a table entry. Each entry includes a complete list of mailbox or telephone number ranges and incoming trunks associated with the serial channel. The table also includes the address of each serial port or line 80 and the name of the device connected to the port, such as Company A SL1 PBX. A single integration process is spawned for each protocol. The table also includes the incoming port numbers that indicate the port on the MSS on which the call will arrive. The table also indicates whether the switching device can receive an MWI and/or a termination packet. The table further includes a range of telephone numbers which are valid for this switching device. A correspondence between the mailbox range and the actual extensions or trunk numbers in the switching device is also maintained, so that packets can be routed to the correct integration process. The configuration table also includes a prefix used to define a switch name or the country code, area code, and exchange components used to expand the unofficial telephone number to a fully qualified telephone number. The conversion operation includes qualifying the system mailbox when the information from the device is not a telephone number. This involves converting the extension number or other identifier such as trunk into a full telephone number. Port remapping also occurs which converts a port number on the switching device into a port on the MSS 20. If the device is a PBX type device this step involves mapping the PBX terminal identifier provided by the PBX device into an MSS port assignment. The MIU then builds an appropriate packet as illustrated in FIG. 3A for transfer to the MSS 20. This build operation involves mapping the call type from the device to a call type appropriate for the MSS 20, filling the calling number identification field by creating an appropriate calling number and loading the incoming port number and the call type into this packet. Once this packet is complete, it is transferred to the interface process 316 using the Unix select based process file descriptor transfer method previously mentioned.

Figure 10:
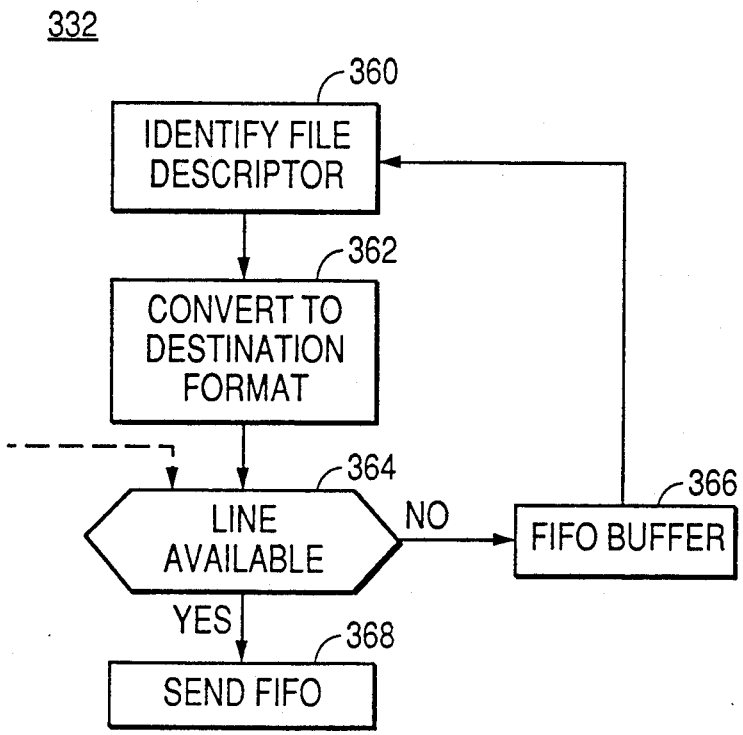
FIG. 10 illustrates the routine 332.

The routine 332, as illustrated in FIG. 10 starts by identifying 360 the file descriptor transferred by the integrations control process 320. The file descriptor determines the protocol and the particular format into which the packet must be converted. The system then converts 362 the return message, such as a message waiting indication, into the appropriate format for the device. The message waiting commands for on and off are converted into the format required by the protocol, and the telephone number is converted into a format used by the protocol. A telephone number is converted by removing the correct number of digits from the front of the telephone number. This is determined to be the length of the telephone number minus the extension length associated with this protocol. Each instance of a protocol may have different telephone number conversion rules. If the phone number is of the form switch name, extension then the switch name is removed, and the extension is reduced to the correct length for the protocol instance by removing digits from the front of the extension, equal to the length of the extension minus the configured extension length for this protocol. When a protocol has defined a hangup or termination packet, the MSS 20 trunk is converted to the switch trunk (either CO or PBX) and the packet is filled in with any other information required. The SL1-IVMS protocol requires a call-id which was associated with the call in the initial arrival packet, requiring the process 312 to maintain the state of call connections. The format and conversion of all information is protocol dependant. The system checks 364 to determine whether the line to that device is available and if not available, stores 366 the message in a first-in-first-out queue. The line over which the packet is transmitted is determined by accessing the configuration table with the telephone number in the packet and the trunk number for a disconnect operation is determined in this same access. If the line is available the system sends 368 the packets in the queue to the device. To get the transfer process associated with a partially full queue started after a line blockage, the system includes an error check routine (not shown) which is activated periodically to determine line availability.

The determination of line availability is protocol dependant. Some protocols (SMDI and SL1) require the sending of invalid packets which generate an error response in order to validate that the link is operational. Other protocols which use polling methods send a known packet and expect a response. Another approach is to test the link prior to each packet transmission by sending an ENQ character and waiting for an ACK response (ENQ and ACK are ASCII control characters). Some protocols (like the NEAX MCI link) have no method of determining availability until a failed transmission is detected. This line availability routine when such processing is completed, transfers the operation control to step 364 so that any messages in the queue can be transferred.

Figure 11:
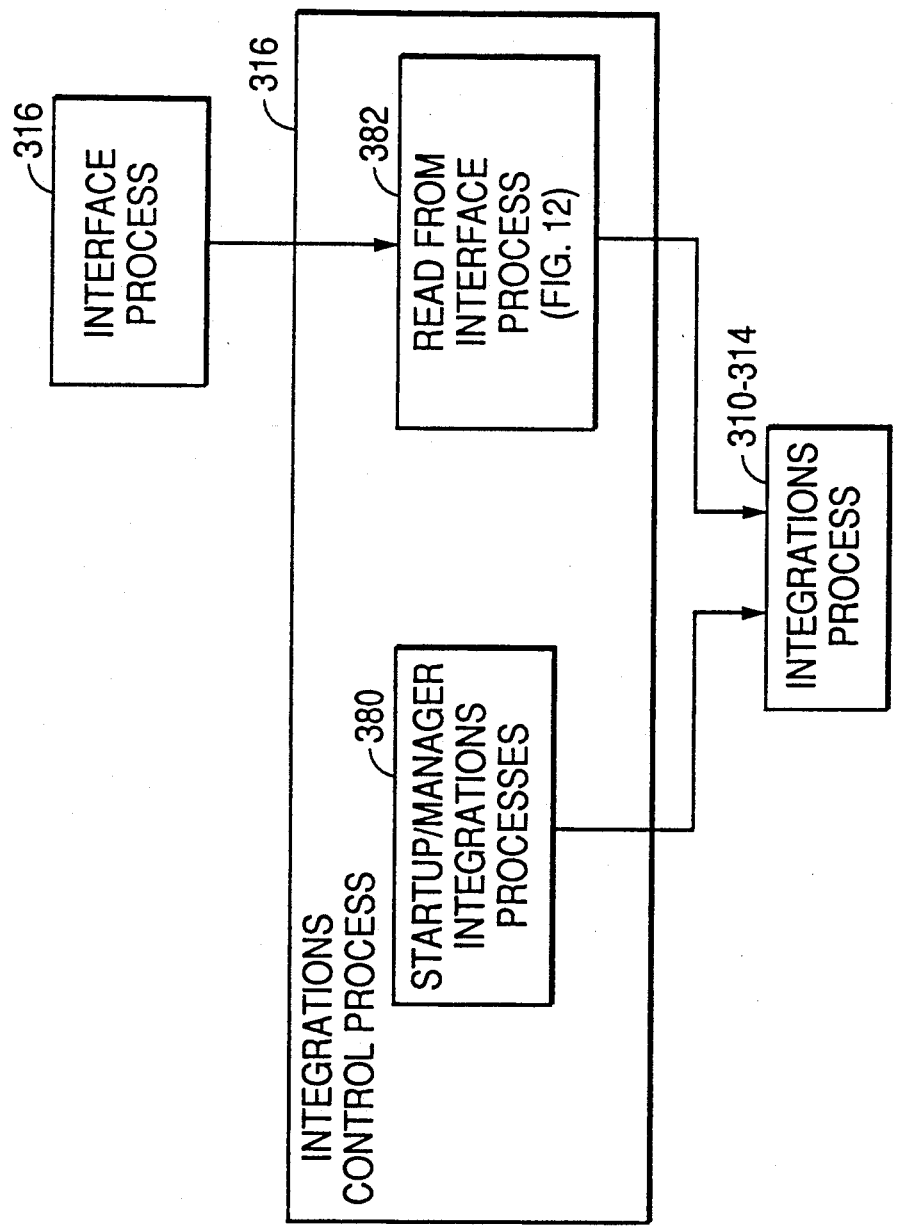
FIG. 11 depicts the integrations control process 316.

As illustrated in FIG. 11, the integrations control process 316 includes two primary routines. The first routine 380 starts up and manages the integration processes 310-314. The start up process includes the conventional operations associated with Unix select based processing in which the integrations control process 316 spawns, forks or creates a copy of itself which is started up and in which the processes which are not used turn themselves off. A process is spawned for each configuration table entry stored in the MIU 22. Each integrations process is passed, as part of the process arguments, the identification of which read and write file descriptors to use. The other primary routine is the read from interface process routine 382. This routine reads a file descriptor from the interface process 316 and transfers the type converted packet to the appropriate integrations process 310-314.

As illustrated in FIG. 12, routine 382 first reads a packet 390 and then determines 392 the packet type. The routine 382 has access to the configuration table that lists telephone numbers and the protocol (for example, SMDI or SL1) that corresponds to that telephone number. The telephone number in the MWI packet illustrated in FIG. 4B first is used to decide which integration process is to be used and the packet is forwarded to that process. The integrations process in a similar manner determines which file descriptor is responsible for the message light actuation event. For termination packets the incoming trunk is used to route the packet to the correct protocol or integration process, which subsequently uses the same number to route to the correct file descriptor. Depending on the packet type or process determined, the system will execute an operation which will find the appropriate mailbox integration process 394 or the appropriate port integrations process 396. Once the appropriate process is found, the system writes 400 the packet to the appropriate process as a file descriptor.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A multiple integration apparatus between a message storage system and first and second message switching devices, said switching devices producing first and second call record information having corresponding first and second protocols where the first and second protocols are different, said apparatus comprising:

first conversion means, coupled to the first message switching device, for converting the first call record information into a first call arrival packet having a uniform protocol and converting a first message end packet having the uniform protocol into a first device message provided to the first message switching device and having the first protocol;

second conversion means, coupled to the second message switching device, for converting second call record information into a second call arrival packet having the uniform protocol different from one of the first and second protocols and converting a second message end packet having the uniform protocol into a second device message provided to the second message switching device and having the second protocol;

interface means, coupled to said first conversion means, said second conversion means and the message storage system, for transferring the first and second call arrival packets to the message storage system and for receiving the first and second message end packets from the message storage system and transferring the first and second message end packets; and integration control means, coupled to said interface means, said first conversion means and said second conversion means for determining which of said first and second conversion means receives the first and second message end packets.

2. An apparatus as recited in claim 1, wherein first and second said call arrival packets comprises a universal call arrival packets.

3. An apparatus as recited in claim 1, wherein said first and second message end packets comprises one of a message waiting indication packet and a call termination packet.

4. An apparatus as recited in claim 1, where said apparatus is connected to multiple first switching devices of a same first type and said first conversion means converts the first call record information from all the first switching devices, and said apparatus is connected to multiple second type switching devices of a same second type and said second conversion means converts the second call record information from all the second switching devices.

5. A message storage apparatus, comprising:

a first telephone call switching device providing first call record information related to a first message by a first user and having a first protocol;

a second telephone call switching device providing second call record information having a second protocol, different from the first protocol, related to a second message by a second user;

a message storage system, connected to said first and second telephone call switching devices, for storing the messages form users in accordance with uniform call record information having a uniform protocol different from one of the first and second protocols; and a multiple integrations unit, connected to said devices and said system, and converting the first and second call record information into the uniform call record information.

6. An apparatus as recited in claim 5, wherein said message storage system produces first and second uniform message complete information after the first and second messages are stored, and said multiple integrations unit converts the first and second uniform message complete information into first and second device specific message complete information responsive to the destination of the first and second uniform message complete information and sends the first and second device specific message complete information to corresponding ones of the first and second telephone call switching devices.

7. An apparatus as recited in claim 5, further comprising a single integration unit, connected between said first telephone call switching device and said multiple integrations unit, and functioning to transfer a call to said message storage system as a substitute for an operator and creating the first call record information.

8. A method of performing an integrations operation for a message storage system for storing user messages and plural switching devices of at least first and second types each type producing corresponding first and second protocol message routing messages which are different and indicate the routing of the user messages, comprising:

(a) creating a conversion process for each type device, each conversion process for converting the first and second different protocol routing messages into a uniform protocol routing message different from one of the first and second protocol message routing messages;

(b) creating an interface process for interfacing between each conversion process and the message storage system and transferring the uniform protocol routing message to the message storage system;

(c) creating a transfer process for transferring response messages from the interface process to each conversion process; and (d) executing the conversion, interface and routing processes.

9. A method as recited in claim 8, wherein each conversion process receives a same format outgoing message from the transfer process and the interface process receives the same format incoming message from each conversion process.

10. A message storage apparatus, comprising:

a message storage system storing messages using call storage information;

a first switching device connected to said message storage system, routing a first message to said message storage system and producing first message arrival information having a first protocol;

a second switching device connected to said message storage system, routing a second message to said message storage system and producing second message arrival information having a second protocol different from the first protocol; and integration means for converting the first and second message arrival information into the call storage information having a uniform protocol different from one of the first and second protocols.

11. An apparatus as recited in claim 10, wherein said message storage system produces first and second message termination information, said integration means converting the first and second message termination information into first and second disconnection information where the first and second disconnection information is different in protocol, and said first and second switching devices discontinuing the routing of the first and second messages upon receipt of the first and second disconnection information.

* * * * *

UNITED STATES PATENT AND TRADEMARK OFFICE
CERTIFICATE OF CORRECTION

PATENT NO. : 5,260,990
DATED : November 9, 1993
INVENTOR(S) : McLampy et al.

It is certified that error appears in the above-indentified patent and that said Letters Patent is hereby corrected as shown below:

Column 2, line 23, "Figs." should be --Fig.--.

Column 7, line 31, "," should be --.--.

Column 12, line 34, "form" should be --from--.

Signed and Sealed this

Twenty-third Day of August, 1994

Attest:

BRUCE LEHMAN

Attesting Officer

Commissioner of Patents and Trademarks